(12) United States Patent
Fletcher et al.

(10) Patent No.: US 10,578,851 B2
(45) Date of Patent: Mar. 3, 2020

(54) AUTOMATED HARDWARE AND SOFTWARE FOR MOBILE MICROSCOPY

(71) Applicant: THE REGENTS OF THE UNIVERSITY OF CALIFORNIA, Oakland, CA (US)

(72) Inventors: Daniel A. Fletcher, Berkeley, CA (US); Michael V. D'Ambrosio, Berkeley, CA (US); Arunan Skandarajah, Berkeley, CA (US); Frank B. Myers, III, Oakland, CA (US); Clay D. Reber, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 252 days.

(21) Appl. No.: 15/487,266

(22) Filed: Apr. 13, 2017

(65) Prior Publication Data
US 2017/0285320 A1 Oct. 5, 2017

Related U.S. Application Data

(63) Continuation of application No. PCT/US2015/056114, filed on Oct. 16, 2015.
(Continued)

(51) Int. Cl.
*G02B 21/26* (2006.01)
*G02B 21/00* (2006.01)
*G02B 21/36* (2006.01)

(52) U.S. Cl.
CPC ......... *G02B 21/26* (2013.01); *G02B 21/0008* (2013.01); *G02B 21/365* (2013.01)

(58) Field of Classification Search
CPC .......... G02B 21/26; G02B 21/361–362; G02B 21/365
(Continued)

(56) References Cited

U.S. PATENT DOCUMENTS

2006/0109343 A1* 5/2006 Watanabe ............ G02B 21/365
348/79
2012/0050853 A1 3/2012 Miller
(Continued)

FOREIGN PATENT DOCUMENTS

JP 477714 B2 6/2010
JP 2013050613 A 3/2013

OTHER PUBLICATIONS

Korean Intellectual Property Office (KIPO), International Search Report and Written Opinion dated Jan. 15, 2016, counterpart PCT International Application No. PCT/US2015/056114, pp. 1-16, with claims searched pp. 17-24.
(Continued)

*Primary Examiner* — Kristina M Deherrera
(74) *Attorney, Agent, or Firm* — O'Banion & Ritchey LLP; John P. O'Banion

(57) ABSTRACT

An automated slide scanning system, comprising one or more optical elements, including an objective, having an optical path configured to be disposed within view of a camera of a portable device. An automated stage disposed within the optical path, the automated stage comprising a platform configured for receiving a slide containing a biological sample and having a drive mechanism for translating the stage in at least one direction with respect to said objective. A communications interface coupled to the automated stage, and is configured for receiving a command from the portable device to control operation of the mechanical stage.

25 Claims, 9 Drawing Sheets

Related U.S. Application Data

(60) Provisional application No. 62/065,560, filed on Oct. 17, 2014.

(58) Field of Classification Search
USPC .......................................................... 359/391
See application file for complete search history.

(56) References Cited

U.S. PATENT DOCUMENTS

2013/0038931 A1  2/2013  Shirota
2014/0063226 A1  3/2014  Kawata

OTHER PUBLICATIONS

Life Technologies Corporation, "EVOS FL Auto Imaging System for Fluorescence and Transmitted Light Applications", Publication No. MAN0007986, Revision A.0, pp. 1-71, 2013.

* cited by examiner

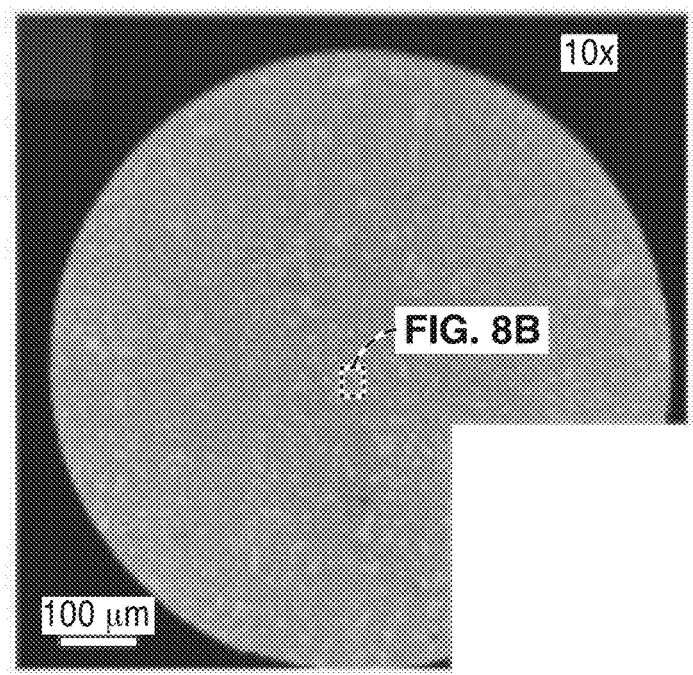
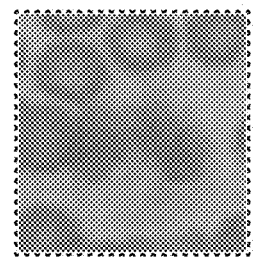
FIG. 8B
FIG. 8A
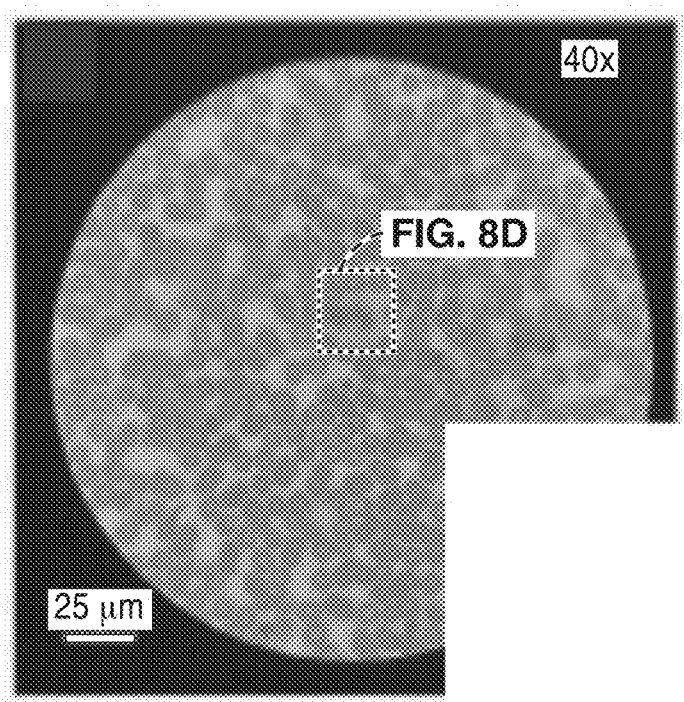
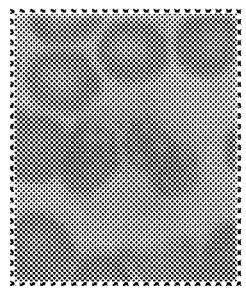
FIG. 8D
FIG. 8C

AUTOMATED HARDWARE AND SOFTWARE FOR MOBILE MICROSCOPY

CROSS-REFERENCE TO RELATED APPLICATIONS

This application is a 35 U.S.C. § 111(a) continuation of PCT international application number PCT/US2015/056114 filed on Oct. 16, 2015, incorporated herein by reference in its entirety, which claims priority to, and the benefit of, U.S. provisional patent application Ser. No. 62/065,560 filed on Oct. 17, 2014, incorporated herein by reference in its entirety. Priority is claimed to each of the foregoing applications.

The above-referenced PCT international application was published as PCT International Publication No. WO 2016/061563 on Apr. 21, 2016, which publication is incorporated herein by reference in its entirety.

STATEMENT REGARDING FEDERALLY SPONSORED RESEARCH OR DEVELOPMENT

This invention was made with Government support under OAA-A-13-00002-12, awarded by the United States Agency for International Development. The Government has certain rights in the invention.

INCORPORATION-BY-REFERENCE OF COMPUTER PROGRAM APPENDIX

Appendix A referenced herein is a computer program listing in a text file entitled "BK_2015_030_3 _US_computer_program_appendix_A.txt" created on Apr. 13, 2017 and having an 80 kb file size. The computer program code, which exceeds 300 lines, is submitted as a computer program listing appendix through EFS-Web and is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to digital microscopy, and more particularly to a portable imaging system compatible with the camera of a smart phone or tablet to capture and analyze microscopic images of a sample in an automated manner.

2. Background Discussion

Traditional microscopes are powerful measurement tools that are used in biology to understand fundamental processes and used clinically to determine whether a disease is present in a sample. These devices normally require significant investment to purchase as well as skilled technicians to use them and regular power for operation. While there are mechanical systems that can be attached to microscopes to automatically acquire images thereby reducing the time required of an operator, current implementations add significantly to cost and still require someone with a reasonable amount of skill to use. This has confined microscopes, both manual and automated, to centralized settings where these resources are available. The domains in which microscopes are used, including clinical diagnostics and laboratories in low-resource settings, would benefit from simplified automated instrumentation with a lower required level of operator skill and utilize a convenient interface with the technology, such as that provided by a touch screen. In clinical diagnostic use, for example, making a measurement at the point of care could enable a faster and more actionable diagnosis, while measurements for water quality would benefit from utilizing freshly prepared samples.

One limitation of current portable imaging systems is that a user must collect images one at a time under manual control. Many microscopy applications demonstrate increased sensitivity when scanning a larger area and inspecting more of the sample. Because of this relationship, it will take a significant amount of time from the user to reach a target level of sensitivity and specificity for certain microscopic assay using current systems.

Another limitation of current microscopy systems capable of distributed use is that it can be challenging for someone without significant training to bring the sample into focus before acquisition. Being able to execute this procedure establishes a minimum level of skill to capture usable images from the sample. Even for trained users, focusing on relevant features in each field adds to the time required to capture images.

Finally, current systems are also unable to immediately analyze the sample and provide an assessment of the sample content on the device itself. They traditionally require a trained interpreter to be on-site or require remote transmission for telemedicine. Applications such as counting tuberculosis bacilli using on-board image processing are thus beyond the capabilities of fully integrated, portable solutions.

In conclusion, there is a need for a low cost portable device with hardware and software automation that can achieve automated sample scanning and focused imaging and be used by a minimally trained operator. Such a system would enable decentralized point-of-collection analysis of clinical and research samples for transmission or on-board analysis.

BRIEF SUMMARY

One aspect is a mobile microscope system for decentralized microscopic data collection and analysis using automation of hardware and software.

The disclosed system comprises a mobile device with a touch screen and camera integrated into a microscope with an automated stage that can adjust the position of a sample relative to the imaging optics. The system enables automated microscopic disease screening and environmental monitoring, applications that currently have long lead times because samples must be transported to a central facility where a skilled microscopist is available to do the tedious task of imaging the slide.

By automating image capture and either digital transmission or on-board analysis, the features of this system enable rapid decision-making for treatment. The user interacts with the system by using a custom touch interface in which gestures and buttons trigger commands including stage motion, image acquisition, and illumination mode. These commands are then relayed to the stage hardware over a wireless or wired interface for a responsive user experience. The user interface also presents opportunities for on-board review and annotation. The device can be configured to image in bright field or multi-color fluorescence. The device can carry out fully automated image capture, improving over other implementations by using a unique set of low-cost hardware and selectively capturing fields of interest through real-time processing of the visible field. To make a decision about the captured data, the system can either upload images for remote review or provide analysis carried out on the device to the user. Finally, the system can respond to changes in its image capture capabilities during field use through the use of on-board calibration targets, adjusting camera properties as necessary or sending out a service request if required.

Diseases that are diagnosed by skilled microscopists employing conventional, manual microscopes could be targeted for replacement by this automated approach. Similarly, diseases diagnosed in centralized facilities by large, fully-automated imaging devices could be replaced by deploying these devices at the location of the patient for data collection and transfer. Specific diagnostic uses include automated screening of slides prepared from: brush biopsy samples of the oral cavity for oral cancer; brush biopsy samples of the cervix for cervical cancer; sputum for tuberculosis presence and drug resistance; blood for differential blood counting, malaria, or parasitic worms; or fecal samples for helminth eggs.

Other commercial applications revolve around rapid, field-response to environmental changes.

Microscopic indicators of biome health could be monitored for damage and recovery after chemical contamination, for example in a marine environment after an oil spill.

By utilizing the imaging, computational processing, and communication capabilities of a mobile phone or tablet in conjunction with automated mechanical components, the system can provide the precise motion, high-quality imaging, and real-time analysis capabilities that enable automated screening in low resource as well as laboratory settings.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 8A and inset FIG. 8B magnification show exemplary SEM images of a Wright-stained blood smear at 100 um.

FIG. 8C and inset FIG. 8D magnification show exemplary SEM images of a Wright-stained blood smear at 25 um.

Figure 9:
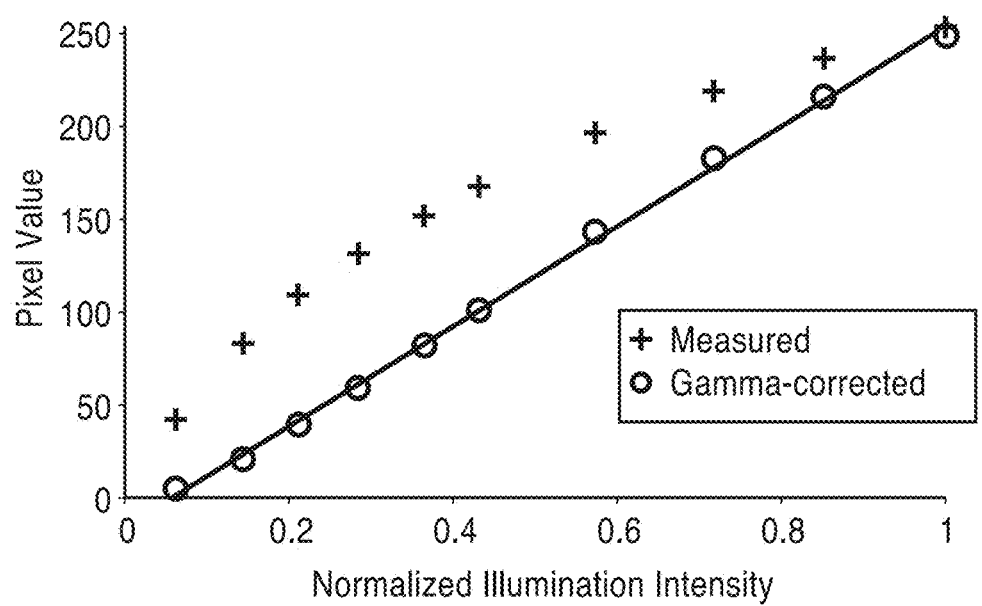

FIG. 9 is a plot of normalized illumination intensity vs. pixel value, illustrating a mobile phone's ability to provide linear measurements of intensity after gamma correction.

DETAILED DESCRIPTION

Figure 1:
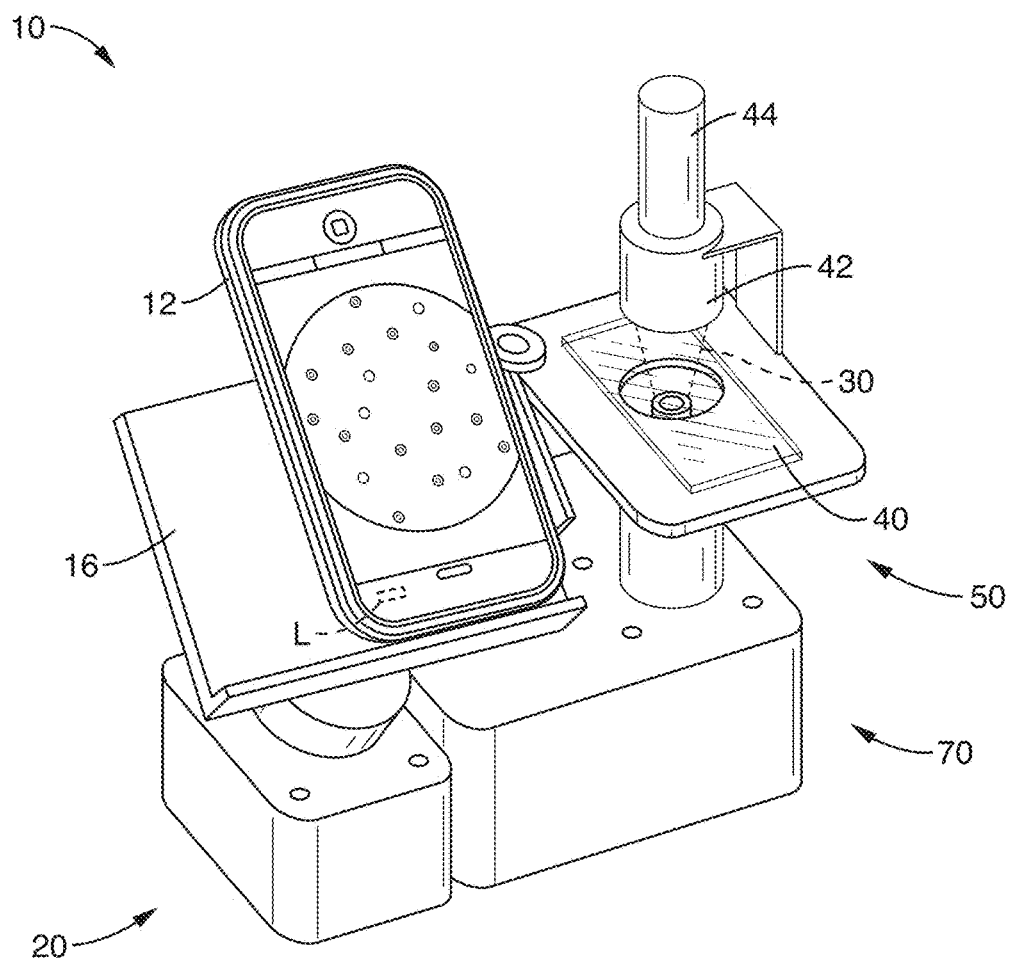
FIG. 1 illustrates a perspective-view schematic diagram of a fully automated slide scanning system in accordance with the present description.

FIG. 1 illustrates a perspective-view schematic diagram of a fully automated slide scanning system 10 in accordance with the present description. System 10 is configured to be adapted for use with various portable devices 12 (e.g. portable cellular devices such as a cellular phone (iPhone depicted in FIG. 1 or tablet (iPad shown in FIG. 2) having a camera 14 (see FIG. 2). A platform 16 is provided such that when portable device 12 is positioned on the platform 16 that lens L of the portable device 12 camera 14 is in-line with optical path 30 and optics module 20 and associated components. A sample slide 40 containing the subject specimen is positioned on an x-y stage 50 (for in-plane scanning and positioning) and is illuminated by light source 44 (e.g. LED light source) and plastic diffuser 42. A z-axis stage 70 is also included for vertical alignment of slide 30 and focusing. It is also appreciated that camera 14 may be separate from the mobile device 12 and controlled via wireless or wired connection.

Figure 2:
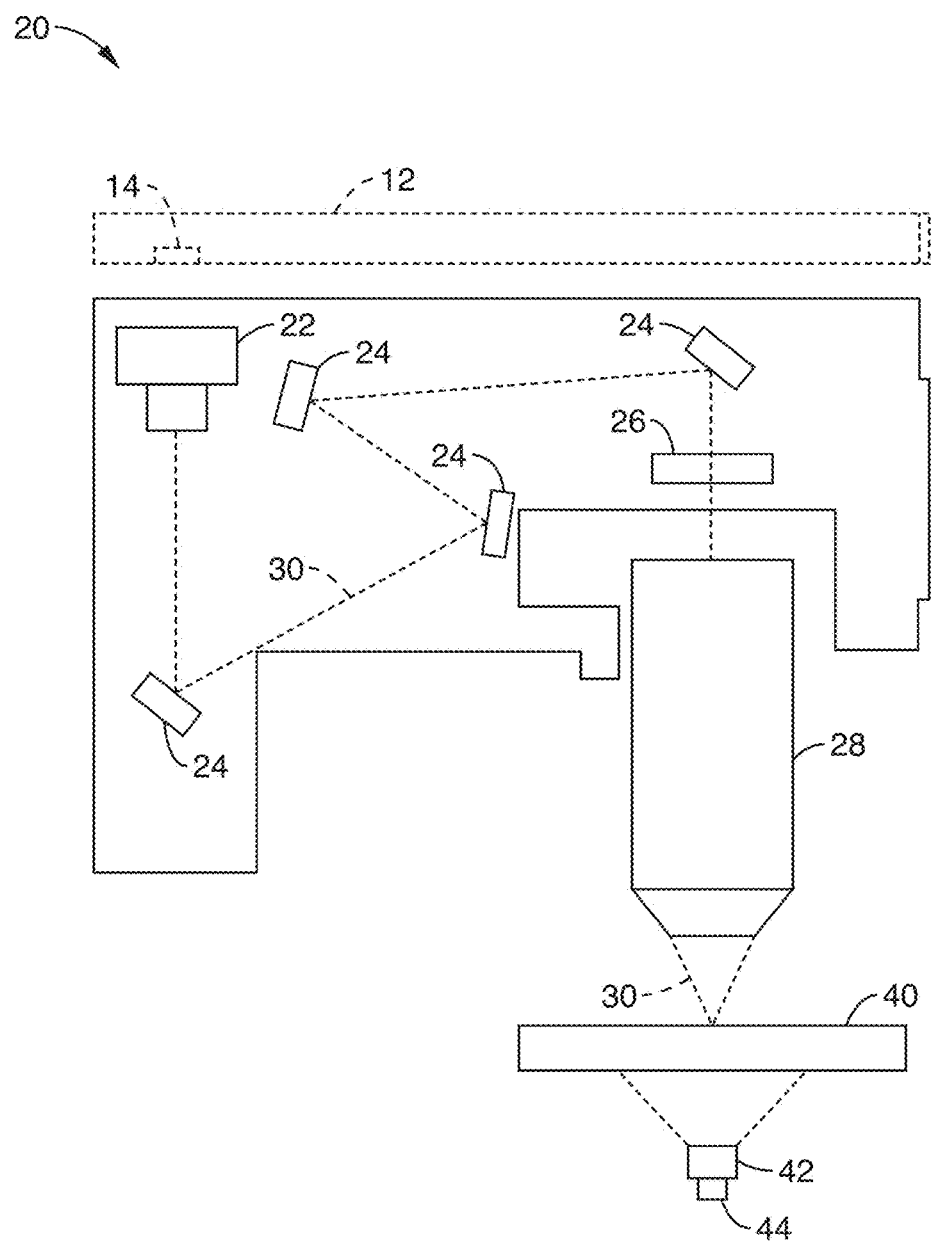
FIG. 2 shows a schematic diagram of an embodiment of a light path and optics module of the system of FIG. 1.

FIG. 2 shows a schematic diagram of an embodiment of a light path 30 and optics module 20. The portable device 12 camera 14 is optically coupled to the system 10 by an eyepiece 22. A series of mirrors 24 direct the light path 30 to an achromatic tube lens 64. An infinity objective 28 is used to image the sample 40. The sample 40 is illuminated by a diffuser 42 dispose in front of an LED or LED array 44.

Figure 3:
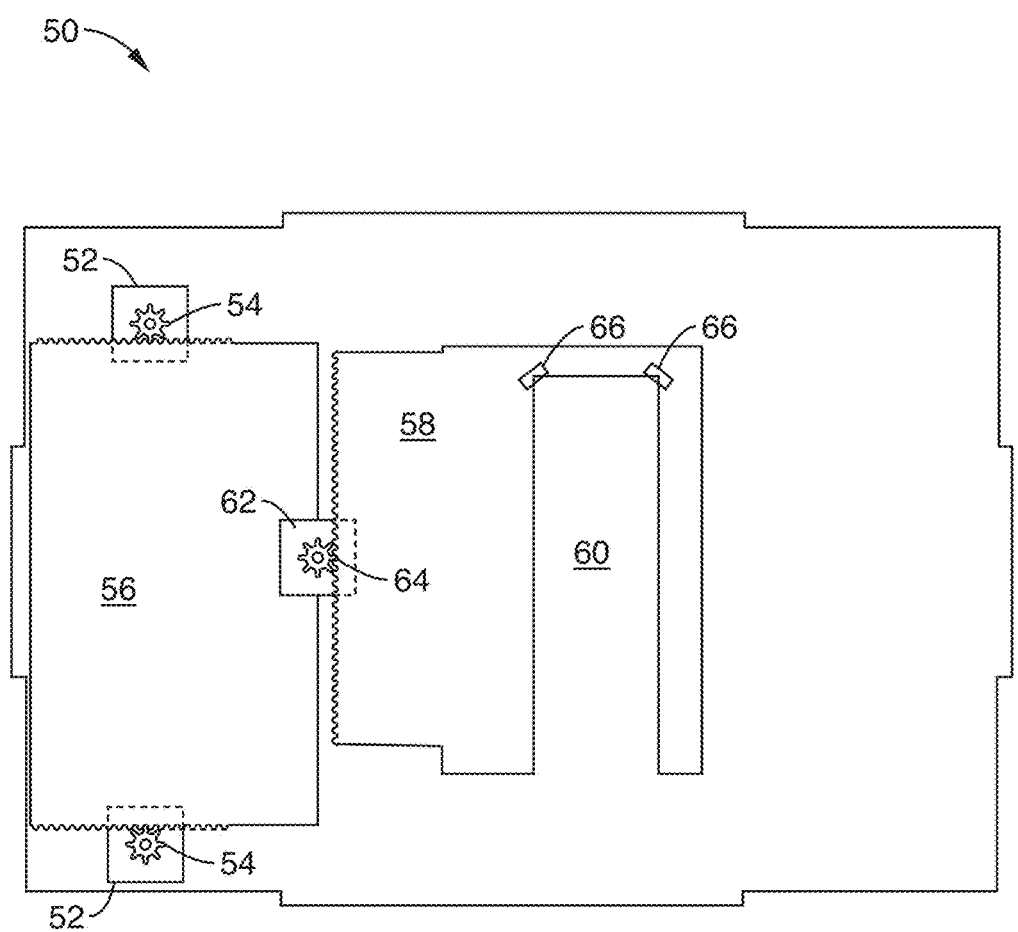
FIG. 3 illustrates a top-view schematic diagram an embodiment of an x-y stage of the system of FIG. 1.

FIG. 3 illustrates a top-view schematic diagram an embodiment of an x-y stage 50 (i.e. 2-D X-Y translation mechanism). In a preferred embodiment, rotational motion of the stepper motor shafts are converted to linear motion of the x-y stage 50 through use of a rack and pinion system which is fabricated and meshed utilizing the complementary laser cutter kerfs to ensure precise meshing A pair of x-axis stepper motors 52 translate the x-axis via a rack and pinion mechanism 54. A single y-axis stepper motor translates the y-axis also by a rack and pinion mechanism 64. A y-axis sample holder 58 is mounted on top of the x-axis platform 56, and is coupled to a holder 66 that grips and translates the sample slide 40. The x-axis is mounted to the base 60 of the device. An LED 42 in line with the y-axis sample 58 holder illuminates the sample, as described in FIG. 1 and FIG. 2.

Figure 4A:
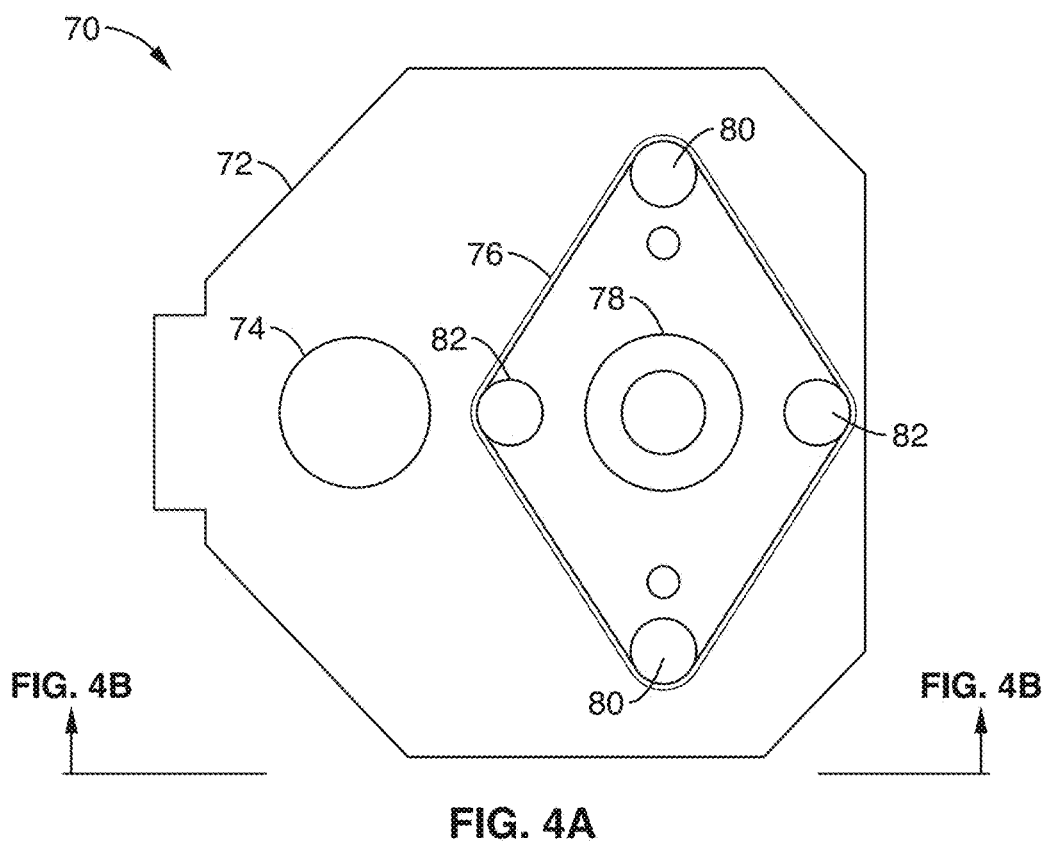
FIG. 4A and FIG. 4B show top and side views, respectively, of a schematic diagram of an embodiment of a focusing mechanism of the system of FIG. 1.
Figure 4B:
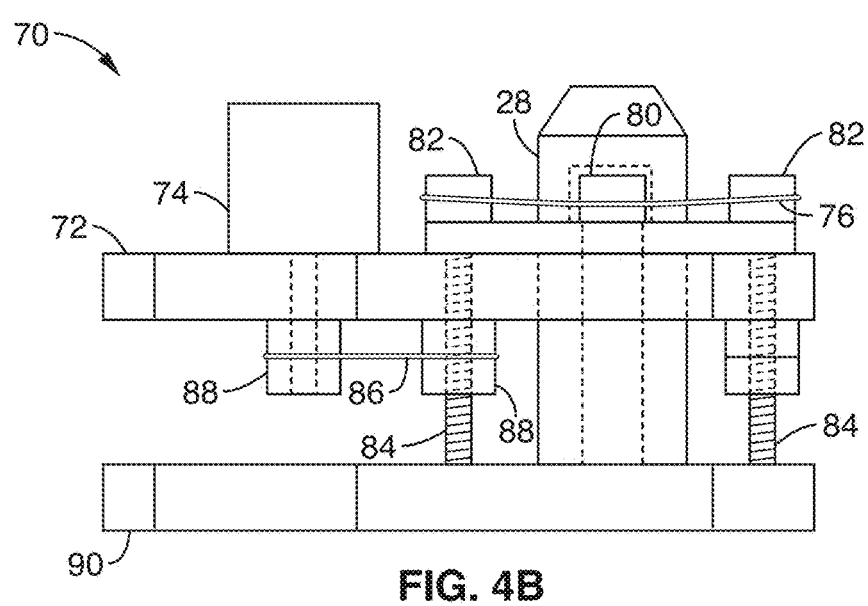

FIG. 4A and FIG. 4B show top and side views, respectively of a schematic diagram of an embodiment of a focusing mechanism 70. A z-axis stepper motor 74 is coupled to motor pulleys 88 via a drive belt 86 which drives a pair of pulleys 82, each attached to lead screws 84. The pulleys 82 are coupled to one another by to a timing belt 76 and a pair of idler pulleys 80 to direct the timing belt 76 around the objective 78. The stepper 74 and lead screws 84 are anchored to a non-moving top platform 72. The objective 78 is attached to translating bottom platform 90, which translates along a pair of linear shafts (not shown) when the lead screws turn via a pair of fixed nuts. Each axis may be guided by ball-bearing rails (not shown).

System 10 may also include vibration-isolation feet attached to the device housing or stages 50, 70 of the device.

While not required, stepper motors are preferably used to provide a precise, inexpensive, simple automated translation mechanism. Stepper motors allow for acceptable accuracy and precision in open-loop operation, and high torque, low speed movement without gearing. In general, the smallest stepper motors that are able to provide an adequate amount of torque at reasonable power consumption are preferred (smaller stepper motors are often notably less efficient than larger ones).

In one embodiment, system 10 measures 155 mm×225 mm×135 mm. In order to achieve such a small form factor, several design decisions were made to minimize size. First, the light path 30 is folded by four mirrors 24, allowing a 200 mm optical path length (the minimum required to achieve acceptable magnification at the imaging sensor, e.g. of an iPad, or similar tablet, or portable cellular device) to be fit into the system 10 with the sample 40 centered. In order to allow for a compact focusing mechanism that involves only moving the objective 28, an infinity system with an achromatic lens 26 is used, with an eyepiece 22 to couple optics to the portable device camera 14. Second, tall components (the objective 28 and the stepper motors 52, 62 and 74) share vertical space to minimize the device's height. Third, elements of the focusing mechanism 70 are in parallel vertical space to the objective 28, occupying otherwise empty space instead of contributing to the device's height.

Figure 5:
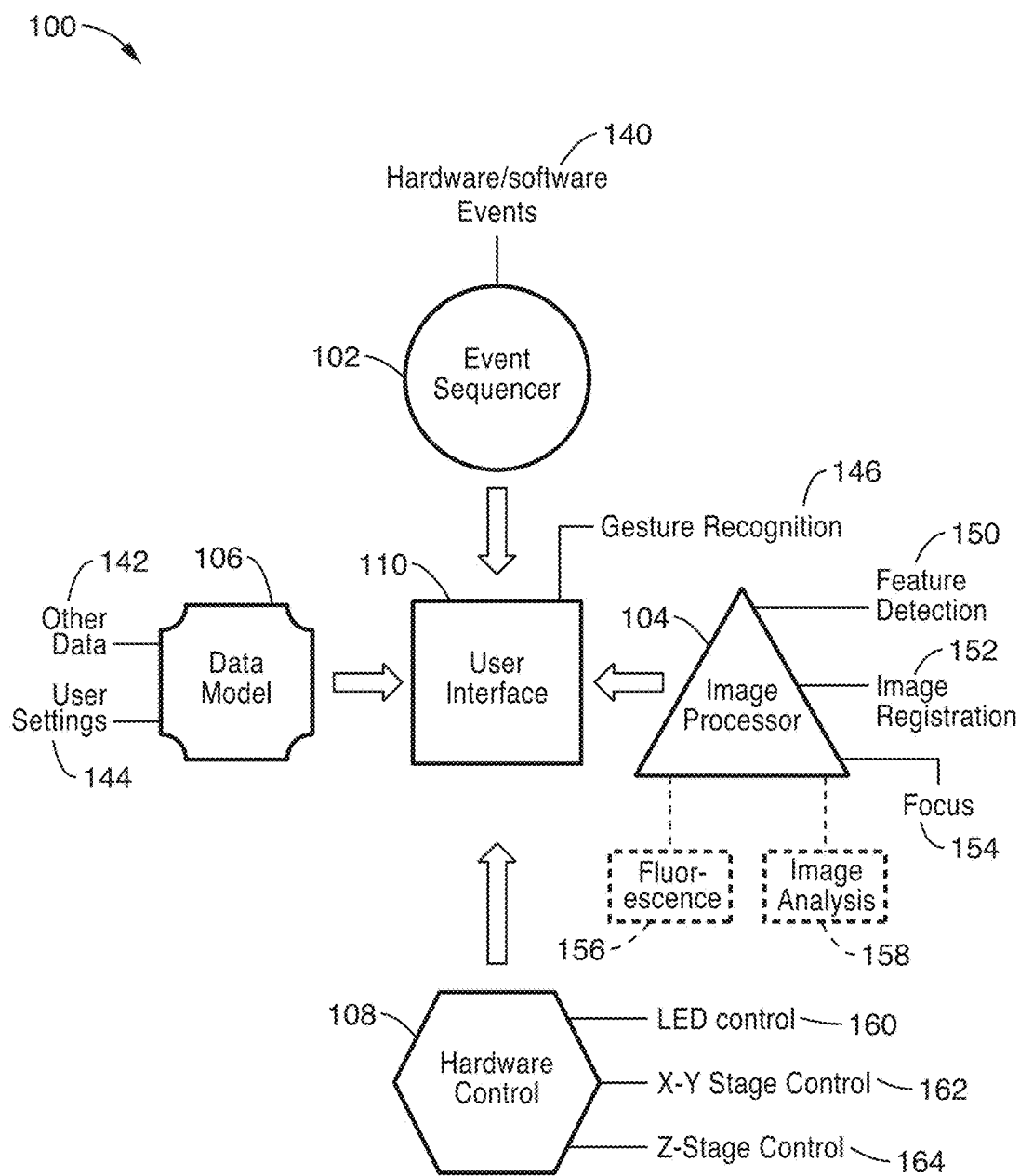
FIG. 5 illustrates a schematic diagram of an embodiment of software organization which may be implemented as application software to be installed on portable device for control of the system of FIG. 1.

FIG. 5 illustrates a schematic diagram of an embodiment of software organization which may be implemented as application software 100 to be installed on portable device 12 for control of system 10. A user interface 110 connects the actions of the user to the rest of the software, and performs some basic tasks like taking a picture with camera 14. User settings 144 and other persistent data 144 are stored in the data model 106. When performing a scan of a slide 40, information from the data model 106 is relayed to the other classes through the user interface 110, although it can also be accessed directly by the other modules, if necessary. The event sequencer module 102 returns to the user interface 110 a sequence of hardware and software events 140 that are to be executed in order to conduct a scan. The user interface 110 then executes these steps. If a step requires manipulation of the device's hardware (like x-y stage control 162 or z-stage control 164 for moving either of the stages 50, 70, respectively), the user interface hands this task to the hardware control module 108. The hardware control module 108 may also be configured to control sample illumination via LED control 160 for operating LED 44 wirelessly (e.g. via Bluetooth LE). Illumination source 44 may also include LEDs or LED arrays for both bright field and fluorescent illumination. These LEDs may be driven by current-mode buck/boost converters (not shown) that are controlled by pulse-width modulated signals, allowing software-controlled brightness. For fluorescence, one or more high-power blue LEDs 44 may be imaged onto the sample plane (critical illumination), although other illumination configurations may be used, including Kohler and oblique. Spectral selectivity may be achieved via excitation and emission filters placed within the illumination optics and collection optics, respectively.

If the step requires an image processing step (like calculating the focus metric via an autofocus module 154), the user interface 110 hands this task to the image processor module 104.

In order to enable the system to intelligently scan a slide, a number of software control techniques may be implemented in application software 100. One obstacle to scanning a large area is maintaining focus. To overcome this obstacle, an auto focusing system may be used based around the standard deviation of the laplacian of the image (e.g. focus metric). Numerous other implementations of the focus metric can be implemented. By moving the z-axis a set amount (via stage 70), and recalculating and comparing the focus metric, proper focus can be converged upon.

In a preferred embodiment, autofocus module 154 sweeps the objective through 5 positions and calculates the focus at each. If a satisfactory peak is not found, the sweep is repeated with a larger distance between each position. In order to limit the possibility of focus being incorrectly moved at position on the slide 40 where there is little or sample present, the autofocus module 154 calculates a content score, which is simply the mean of the image, and will only attempt to focus if it is above a user-set threshold. Note that this safe-guard generally works when the system is already near focus, such as if it is in the middle of scanning a large area where if found focus at a previous position.

The autofocus module 154 may also be configured to analyze the relationship of the focus metric scores to determine how likely it is that focus is achieved, and optionally increases the search area. As the content score can be calculated rapidly, it also enables a mode of acquisition where the device rapidly scans an area at low resolution, only slowing to produce full-resolution images where there is sufficient content. Alternate implementations of focusing can include capturing focus information from both bright field and fluorescence channels and using some combination as a focus metric.

In order to make the system 10 user intuitive, a gesture recognition—based control module 146 may be implemented for control of the stages 50, 70. The gesture recognition module 146 is configured to move the stages 50, 70 corresponding to dragging or swiping gestures on the screen of the portable device (e.g. iPad). The speed and positional movement (in pixels) of these gestures may be used to calculate the rate and distance that the stage 50 or 70 will move. The rate and distance is then relayed to the stage via wireless communication (e.g. Bluetooth LE). Gesture controls may also be used to allow zooming and panning, both on live and previously taken images, display the magnified images, as well as provide an interface for control data collection, analysis, and transmission. Gesture recognition—based control module 146 may be configured to operate with hand gestures either in contact with the screen of device 12 or detected by a non-contact method (e.g. front-facing camera) to control microscope, stage, and data functions. Gesture recognition —based control module 146 may also control stage movement through a wired or wireless (e.g. Bluetooth) connection to the motors that control sample movement and focus through specific sequences (e.g. double taps, long taps, etc).

Application software 100 may also be configured to enhance the accuracy of the stages 50, 70. When scanning large objects of which only a piece fits in one field of view, it is desirable to reconstruct these pieces to be able to interact with the entire object. With micron-scale resolution, as is preferred for tuberculosis diagnosis, this would require sub-micron scale movement of the sample 40 if done purely mechanically. Instead, an image registration routine 152 may be included within processing module 104 and or hardware control module 108 that is configured for stitching together images taken with some positional ambiguity based on the content of the image. Image registration module 152 may also be used to provide closed-loop control to the z-stage motor 74 and x-y stage motors 52 and 62 in near real-time. By tracking the motion of features on the screen, it can be determined how far the sample 40 has actually translated with sub-micron accuracy. Furthermore, when attempting to move the sample 40 back to a previous location, image registration module 152 can be used to reposition the stage with enhanced accuracy if sufficient optical content is present.

Image processing module 104 may also include algorithms 150 for the automated detection of features within an image, such as bacteria, that are relevant for diagnosis. These features can be presented to a trained user for evaluation or can be automatically evaluated using a computational diagnosis algorithm.

It is appreciated that software 100 may be configured for implementing a number of various automated algorithms for calibration, analysis, and diagnosis. By using a known reference sample (not shown) embedded within the instrument, automated self-testing and calibration can be performed on a regular basis.

For example, a calibration sample may be automatically positioned under the collection optics during a "self test" routine in order to provide calibration images for focus, field flatness, illumination intensity, illumination uniformity, exposure, contrast, optical resolution, or translation/backlash measurements, among other features.

Furthermore, the results from the self test routine may be compared with thresholds set for performance along dimensions of calibration images for focus, field flatness, illumination intensity, illumination uniformity, exposure, contrast, monitoring resolution, signal-to-noise ratio, and stage translation/backlash to alert the user for maintenance and automatically order replacement parts to be delivered to the location of the system 10.

An embodiment of software 100 for device control is provided in Appendix A.

Figure 6:
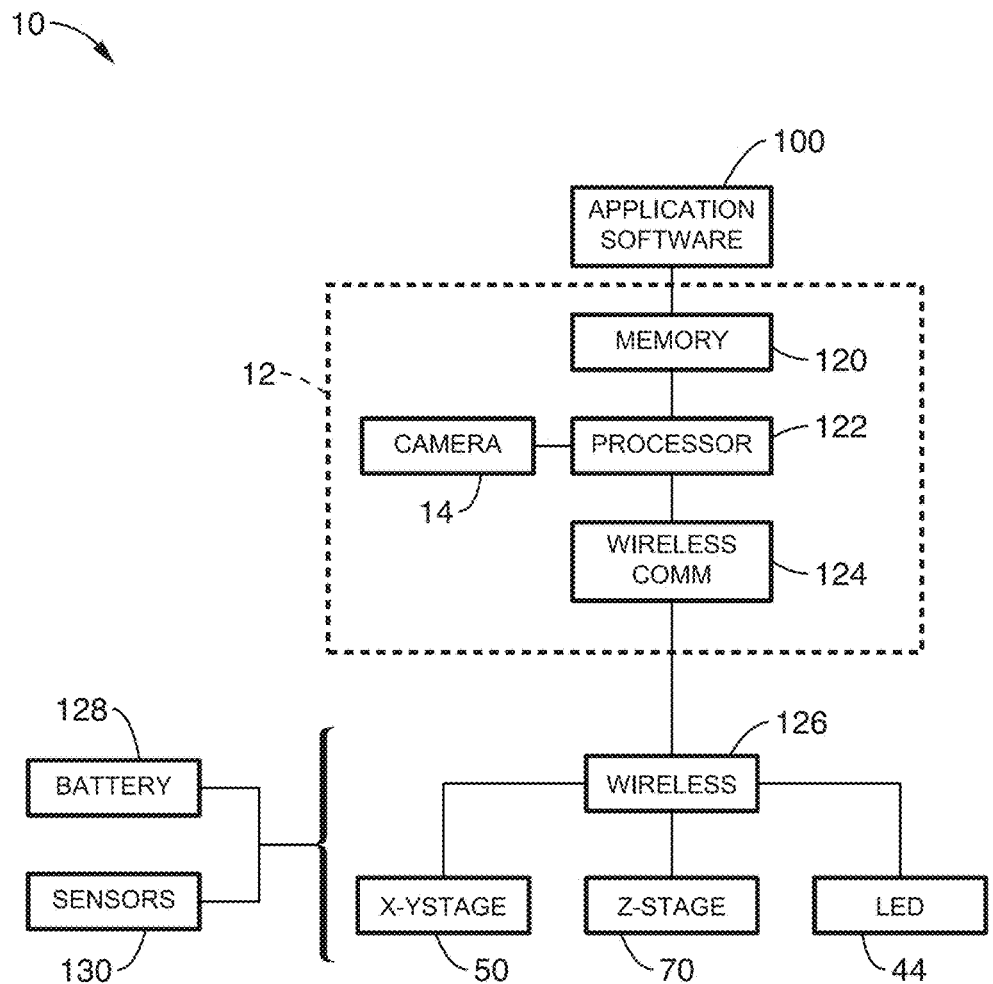
FIG. 6 shows a schematic diagram of an exemplary implementation of the hardware and software of the automated slide scanning system of FIG. 1 with a mobile device in accordance with the present description.

FIG. 6 shows a schematic diagram of an exemplary implementation of the hardware and software of the automated slide scanning system 10 with a mobile device in accordance with the present description. In a preferred embodiment, application software is loaded into memory 120 of portable device 12. The onboard processor 122 of the device 12 may be used to execute the application programming 100 for execution of various functions detailed in FIG. 5, operate camera 14, and communication via wireless communication hardware 124 (e.g. Bluetooth, Wi-Fi, etc.) to the various hardware components of the system 10.

In one embodiment, one or more wireless communication devices 126 may be coupled to the system hardware (e.g. x-y stage 50, z-stage 70, LED 44) for transmission of commands or data between the portable device 12, individual components, or other external device. In one embodiment, communication device 126 may comprise a Bluetooth LE board, which communicates via SPI to an Arduino, and instructs downstream electronics driving the motors (e.g. a stepper motor controller featuring an Allegra A4983 or an on-board servo control hardware (both not shown)). Bluetooth LE is an ideal protocol for battery-powered applications such as system 10 where high communication bandwidth is not required.

As seen in FIG. 6, batteries 128 (e.g. an internal rechargeable battery or a switchable external battery) may be used to power any of the stage components 50, 70 or illumination source 44. Sensors, e.g. hall sensors, may also be employed in one or more of stage components 50, 70 to provide position feedback.

It is appreciated that the components shown in system 10 of FIG. 1 through FIG. 6 any be interchangeably used with various complexity to accommodate different uses or applications.

For example, FIG. 1 through FIG. 6 generally show a first embodiment with a fully automated slide scanning system with three-axis motion control, where two of the axes control the x-y positioning of the slide under the imaging optics having an infinity-corrected objective and a tube lens, and a third axis positions the imaging optics to bring the sample into focus. In one embodiment, an iPad with a built-in camera, positioned above imaging optics captures images and controls the three motion axes via Bluetooth Low Energy (LE).

A particular implementation of this first embodiment is for imaging of stained cells from brush biopsies of suspected oral cancer lesions. Early diagnosis of oral cancer dramatically improves the outcome of clinical interventions. In parts of the world where oral cancer is most prevalent, there is often also insufficient infrastructure to detect patients at early stages. Patients are unable to reach centralized facilities to reach qualified staff and the necessary instrumentation because of cultural and economic barriers. There are local providers of healthcare, but they are not equipped to make a determination and ineffective at encouraging patients to pursue further care. A distributed system for microscopic analysis, if paired with appropriate sample collection and preparation, could enable broader screening of at-risk members of the population at this local level. This first embodiment preferably includes transmission and remote analysis of images collected from the system 10, although diagnosis or risk-stratification may also be implemented on system 10 through on-board approaches similar to those described in the other embodiments described below.

A second embodiment includes the features of the second embodiment, and alternatively incorporates an image processing module 104 that includes modules for fluorescence imaging 156, resolution calibration, and on-board image analysis 158 for the detection and quantification of particles in the image.

One implementation of this second embodiment includes quantification and/or detection of Mycobacterium tuberculosis bacilli in human sputum smears (sample 40) collected from patients in various healthcare settings. In this second configuration, the smears are stained with Auramine-O, a fluorescent dye commonly used for TB diagnosis. The smear slide 40 is then inserted into the system 10, which automatically focuses and images (via application software 100) several hundred fields across the smear. A image analysis module 158 may include a support vector machine (SVM) algorithm that has been trained to detect the rod-shaped bacilli, analyze each image, and then return a quantitative estimate of the number of bacilli present in the sample. This modified system enables the automated diagnosis of tuberculosis from a symptomatic patient in under an hour. The second configuration is preferably portable, battery powered, and requires minimal user training. As such, it is ideally positioned to address the estimated three million TB cases that go undiagnosed each year due to inadequate diagnostic resources in remote and low income settings.

In a third embodiment, the system alternatively uses a one-dimensional scanning system (e.g. stage 50 of FIG. 1 comprises an x-stage translation only) that uses a hobby servo motor as the drive mechanism and the portable device 12 (e.g. built-in focusing mechanism of the portable device camera 14) to eliminate the need for a separate focusing motor (e.g. z-stage mechanism 70). The imaging optics module 20 in this third embodiment may comprise of a conventional finite imaging system based on an objective or of a second mobile phone lens-group that is inverted. The configuration of this third embodiment is capable of scanning one row of a slide or capillary and user-defined increments and includes automated image processing of images and movies to calculate results. One particular implementation or application of this third embodiment is for quantification of the filarial parasite Loa loa (i.e. quantify Loa mf load) in whole blood.

In this third configuration, application software 100 may contain programming or a user interface 110 that gives simple instructions to the user on loading the device, and automatically acquires 5-second videos of 5 fields of view. When the acquisition is complete, the application software 100 runs an image-processing algorithm within module 104 on the videos to quantify Loa mf/ml. To start a test, the operator simply loads blood from a finger prick into a capillary pre-fitted into a sample holder 40, inserts the holder into the system, and presses a single button on the portable device (e.g. iPhone or the like).

A fourth embodiment of system 10 alternatively combines the compact inverted lens imaging system of the third embodiment with three-axis motion control. This fourth embodiment is distinct from the first embodiment in its use of simplified optics, and a simple, less accurate drive mechanism that is nonetheless sufficient for imaging at the lower magnification of the simplified optics. One implementation of this device is for analysis of blood smears to quantify malaria load.

The fourth embodiment preferably runs an application 100 that allows gesture recognition 146 based slide control with optical feedback, and can use multiple autofocus algorithms 154. This four the embodiment is preferably configured to exchange images and data with a remote server via wireless communication module 126 (see FIG. 6), which preferably has an interface to review previously taken data and annotate images. To use this fourth embodiment, the operator inserts a slide 40 and secures the slide with a magnetic holder, and presses a button to load the slide and optionally start a full scan.

In the simplified third and fourth configurations above, where less precision is required due to lower magnification and resolution, hobby servo motors with built-in feedback are preferably used in place of stepper motors. Servo motors provide higher max torque at lower power, but suffer from torque limitations when approaching the set point, leading to less reproducibility and inability to move small amounts. In order to enable gross reproducibility when scanning multiple slides, one absolute position is encoded using a pair of hall-effect sensors 130 on the system housing (one for x and one for y) which correspondingly include a pair of magnets on the x-y stage. While other sensor types may be employed, contactless hall-effect sensors were selected because of their long lifetimes and high precision.

With respect to compatibility of system 10 with differing portable devices 12, and particularly mobile devices such as iPhones or iPads, a significant advantage of using an iPad or iPhone in the above implementation is connectivity. Because these devices 12 are capable of connecting to the internet and accessing remote servers, images and data can be sent to and from the system 10. This allows for remote diagnosis of images, remote quality control, offloading complex computational tasks from the device, and pushing of software and algorithmic updates to the system 10. In addition, the GPS sensor in the iPad or iPhone 12 can be used to geotag diagnoses, enabling disease monitoring and epidemiological studies.

Finally, thanks to the rich, intuitive user interface of the iPad or iPhone 12, training materials may be directly embedded into the application software 100. For example, language-specific videos can be used to demonstrate sample collection, sample preparation, slide loading, and diagnosis interpretation, further simplifying user training.

Figure 7:
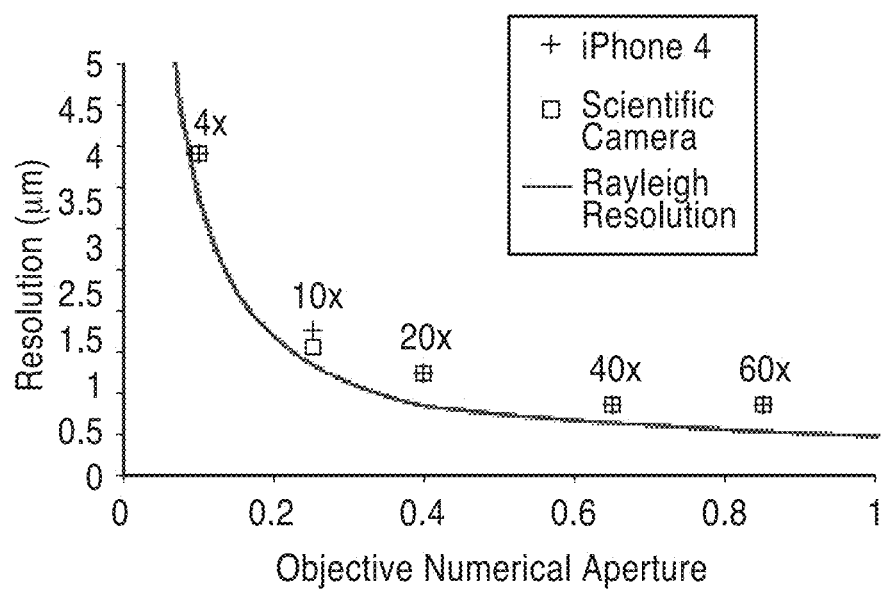
FIG. 7 shows a plot comparing resolution at various numerical apertures for an iPhone and scientific camera with respect to Raleigh resolution.

When implemented with system 10 of the present description, these devices also provide advantageous optics/imaging qualities. FIG. 7 shows a plot comparing resolution at various numerical apertures for an iPhone and scientific camera with respect to Raleigh resolution. FIG. 8A and inset FIG. 8B magnification show exemplary SEM images of a Wright-stained blood smear at 100 um. FIG. 8C and inset FIG. 8D magnification show exemplary SEM images of a Wright-stained blood smear at 25 um. FIG. 9 is a plot of normalized illumination intensity vs. pixel value, illustrating a mobile phone's ability to provide linear measurements of intensity after gamma correction.

All of the above embodiments are preferably complemented by an intuitive user interface 110 for gesture-based control 146 and on-board video tutorials for instruction. The system may also operate in an automatic mode that includes slide loading, auto focusing, and taking pictures over a large sample area, often from a slide.

In accordance with the above embodiments, application software 100 may be configured to include gesture control to move one or more stages in proportion to the gesture and/or initiate an automated sequence of motions., control imaging features, including focus, exposure, color balance, contrast, etc., control sample illumination mode (bright field, dark field, phase, etc) or intensity, control an arrayed LED illumination source to vary the orientation and numerical aperture of the illumination or initiate the acquisition of a series of illumination states, vary the digital magnification of the region of interest and display a corresponding size calibration (the dynamic scale bar), switch the light collecting optic (i.e. the objective 28) to vary the numerical aperture, resolution, and field of view, etc.

Furthermore, application software 100 may be configured to include modules for analyzing the image captured and additionally process the image during stage motion to determine the distance traveled (e.g. by autocorrelation), providing feedback on motor control for pixel-scale positioning accuracy. The application software 100 may be configured to discern the amount of relevant material in the field of view and automatically capture fields above a user-defined threshold while passing over the remainder, and additionally process the image to determine a reference point based on feature recognition of a reference point in the sample.

Application software 100 may also incorporate electronic medical record keeping, and GPS geotagging of acquired images, where geotagging is used for disease epidemiology, outbreak monitoring, or patient follow-up planning. Functionality for SMS text-message or voice calls may be implemented, which relay information about the data collected by the device to stakeholders (users, supervisors, doctors, patients, etc.). The application software 100 may be configured to transmit images, videos, analysis results, device usage data, and medical record data to a cloud server for analysis, storage, or dissemination, as well as analyze collected images or videos and provide an automated clinical diagnosis.

Further aspects of application software 100 include functionality for detection of bacteria in stained specimens, provide sub-images of interest to the user for evaluation, include a support-vector machine algorithm which uses shape metrics to classify features within an image, automatically align and stitch neighboring fields, creating a larger image mosaic, acquire a mosaic of the slide area at a lower capture resolution and present it to the user for selection of the region of interest to be captured at a higher resolution, and detect a calibration target and automatically adjusts camera, stage, or analysis settings depending on the features of said target.

As a result of this novel combination of hardware and software features, the system 10 represents a platform for microscopic data acquisition in low-resource or non-traditional locations where infrastructure and user skill may be insufficient for existing technologies.

Embodiments of the present technology may be described herein with reference to methods and systems according to embodiments of the technology, and/or procedures, algorithms, steps, operations, formulae, or other computational depictions, including flowchart illustrations thereof, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An apparatus comprising a mobile device (phone, tablet, etc) with a touch screen and camera, integrated into a microscope with an automated stage that moves a sample below an objective.

2. The apparatus of any preceding embodiment, with an internal rechargeable battery or a switchable external battery.

3. The apparatus of any preceding embodiment, where the touch screen is used to display the magnified images, control the stage movement through hand gestures, and/or control data collection, analysis, and transmission.

4. The apparatus of any preceding embodiment, where hand gestures either in contact with the screen or detected by a non-contact method (e.g. front-facing camera) control microscope, stage, and data functions.

5. The apparatus of any preceding embodiment, where gestures control stage movement through a wired or wireless (e.g. Bluetooth) connection to motors that control sample movement and focus through specific sequences (e.g. double taps, long taps, etc).

6. The apparatus of any preceding embodiment, where the motors move the sample and/or the optical system (in the case of an infinity optics system) to collect data.

7. The apparatus of any preceding embodiment, where software on the mobile device under gesture control is used to move the stage in proportion to the gesture and/or initiate an automated sequence of motions.

8. The apparatus of any preceding embodiment, where software on the mobile device under gesture control is used to control imaging features, including focus, exposure, color balance, contrast, etc.

9. The apparatus of any preceding embodiment, where software on the mobile device under gesture control is used to control sample illumination mode (bright field, dark field, phase, etc) or intensity.

10. The apparatus of any preceding embodiment, where software on the mobile device under gesture control is used to control an arrayed LED illumination source to vary the orientation and numerical aperture of the illumination or initiate the acquisition of a series of illumination states.

11. The apparatus of any preceding embodiment, where software on the mobile device under gesture control is used to vary the digital magnification of the region of interest and display a corresponding size calibration (the dynamic scale bar).

12. The apparatus of any preceding embodiment, where software on the mobile device under gesture control is used to switch the light collecting optic (the objective) to vary the numerical aperture, resolution, and field of view.

13. The apparatus of any preceding embodiment, where the illumination and/or collection optics utilize a compact folded optical path.

14. The apparatus of any preceding embodiment, where the camera is a separate from the mobile device and controlled wirelessly.

15. The apparatus of any preceding embodiment, where activation of proximity sensors (e.g., Hall Effect or limit switches) on each axis are used to represent an origin point for the sample position in the microscope.

16. The apparatus of any preceding embodiment, where software for analyzing the image captured can additionally process the image during stage motion to determine the distance traveled (e.g. by autocorrelation), providing feedback on motor control for pixel-scale positioning accuracy.

17. The apparatus of any preceding embodiment, where software on-board can discern the amount of relevant material in the field of view and automatically capture fields above a user-defined threshold while passing over the remainder.

18. The apparatus of any preceding embodiment, where onboard software incorporates tutorials to guide the user of the instrument.

19. The apparatus of any preceding embodiment, where software for analyzing the image captured can additionally process the image to determine a reference point based on feature recognition of a reference point in the sample.

20. The apparatus of any preceding embodiment, where illumination optics and interference filters are used for fluorescence imaging.

21. The apparatus of any preceding embodiment, where the illumination optics and filters are changed for multi-channel fluorescence imaging.

22. The apparatus of any preceding embodiment, incorporating a calibration sample which is automatically positioned under the collection optics during a "self test" routine in order to provide calibration images for focus, field flatness, illumination intensity, illumination uniformity, exposure, contrast, optical resolution, or stage translation/backlash.

23. The apparatus of any preceding embodiment, where results from the self test routine are compared with thresholds set for performance along dimensions of calibration images for focus, field flatness, illumination intensity, illumination uniformity, exposure, contrast, optical resolution, and stage translation/backlash to alert the user for maintenance and automatically order replacement parts to be delivered to the location of the instrument.

24. The apparatus of any preceding embodiment, with vibration-isolation feet attached to the base.

25. The apparatus of any preceding embodiment, incorporating electronic medical record keeping.

26. The apparatus of any preceding embodiment, incorporating GPS geotagging of acquired images.

27. The device and GPS geotagging feature above, in which geotagging is used for disease epidemiology, outbreak monitoring, or patient follow-up planning.

28. The apparatus of any preceding embodiment, incorporating software for SMS text-message or voice calls which relay information about the data collected by the device to stakeholders (users, supervisors, doctors, patients, etc.).

29. The apparatus of any preceding embodiment, incorporating software to transmit images, videos, analysis results, device usage data, and medical record data to a cloud server for analysis, storage, or dissemination.

30. The apparatus of any preceding embodiment, where the mobile device incorporates analysis software to analyze collected images or videos.

31. The apparatus of any preceding embodiment, where the software provides an automated clinical diagnosis.

32. The apparatus of any preceding embodiment, where the software is a support-vector machine algorithm which uses shape metrics to classify features within an image.

33. The apparatus of any preceding embodiment, where the software detects bacteria in stained specimens.

34. The apparatus of any preceding embodiment, where the software presents sub-images of interest to the user for evaluation.

35. The apparatus of any preceding embodiment, where the software automatically aligns and stitches neighboring fields, creating a larger image mosaic.

36. The apparatus of any preceding embodiment, where the software can acquire a mosaic of the slide area at a lower capture resolution and present it to the user for selection of the region of interest to be captured at a higher resolution.

37. The apparatus of any preceding embodiment, where the software detects a calibration target and automatically adjusts camera, stage, or analysis settings depending on the features of said target.

38. The apparatus of any preceding embodiment, where low-cost rack and pinion parts are fabricated and meshed utilizing the complementary laser cutter kerfs to ensure precise meshing.

39. An automated slide scanning system, comprising; one or more optical elements having an optical path configured to be disposed within view of a camera of a portable device; the one or more optical elements comprising an objective; an automated stage disposed within the optical path; the automated stage comprising a platform configured for receiving a slide containing a biological sample; the automated stage comprising a drive mechanism for translating the stage in at least one direction with respect to said objective; and a communications interface coupled to the automated stage; wherein the communication interface is configured for receiving a command from the portable device to control operation of the mechanical stage.

40. The system of any preceding embodiment, the portable device comprising a cellular device having a processor and memory, the system further comprising: application programming configured to be stored as instructions in non-transitory computer-readable memory on the portable device; and wherein the application programming is executable on the processor for executing the command.

41. The system of any preceding embodiment: wherein the automated stage comprises an x-y stage comprising independent drive mechanisms for x-axis translation and y-axis translation of the slide with respect to the objective; and wherein the application programming is configured for controlling motion of the x-y stage via one or more commands initiated from the portable device.

42. The system of any preceding embodiment: wherein the automated stage comprises a z-axis stage comprising an independent drive mechanism for z-axis translation of the slide with respect to the objective; and wherein the application programming is configured for controlling motion of the stage via one or more commands initiated from the portable device to focus imaging of the sample on the slide.

43. The system of any preceding embodiment, further comprising: an illumination source coupled to the automated stage, the illumination source configured to direct light at the slide; and wherein the programming is further configured to control operation of the illumination source via one or more commands initiated at the portable device.

44. The system of any preceding embodiment, wherein the objective comprises an infinity objective, and the optical elements further comprise a plurality of mirrors folding the light path into a compact light path in line with an achromatic tube lens and the infinity objective.

45. The system of any preceding embodiment: wherein the portable device comprises a touch screen; and wherein the application software comprises a gesture recognition module configured to control motion of the automated stage in response to one or more hand gestures applied to the touch screen.

46. The system of any preceding embodiment: wherein the communications interface comprises a wireless communication interface, and wherein motion of the automatic stage is controlled wirelessly from one or more hand gestures initiated at the touch screen.

47. The system of any preceding embodiment, wherein translation of the automatic stage is in proportion to the one or more gestures.

48. The system of any preceding embodiment, wherein translation of the automatic stage is affected as an automated sequence of motions in response to the one or more gestures.

49. The system of any preceding embodiment, wherein the programming is further configured to control one or more of bright field, dark field, phase, or intensity of the light directed by the illumination source.

50. The system of any preceding embodiment: wherein the illumination source comprises an LED array; and wherein the application programming is further configured to vary the orientation and numerical aperture of the illumination light directed by the illumination source or initiate the acquisition of a series of illumination states with respect to the light directed by the illumination source.

52. The system of any preceding embodiment, wherein the application programming is configured to vary one or more of the numerical aperture, resolution, and field of view of the objective.

53. The system of any preceding embodiment wherein the application programming is configured to vary a digital magnification of a region of interest of the sample and display a corresponding size calibration corresponding to the magnification.

54. The system of any preceding embodiment, wherein where illumination source and application programming are configured for fluorescence imaging of the sample.

55. The system of any preceding embodiment, further comprising: a calibration sample positioned within the optical path; wherein the application software is configured to perform a calibration routine to provide calibration images of the sample of one or more of: focus, field flatness, illumination intensity, illumination uniformity, exposure, contrast, optical resolution, or stage translation/backlash.

56. The system of any preceding embodiment, wherein the application programming is configured to apply one or more shape metrics to classify features within an image of the sample.

57. The system of any preceding embodiment, wherein the application programming is configured to process an image of the sample during motion of the automatic stage to determine a distance traveled and providing feedback for pixel-scale positioning of the automatic stage.

58. The system of any preceding embodiment, further comprising: one or more proximity sensors coupled to the automatic stage; and wherein the one or more proximity sensors provide position data of the automatic stage for establishing one or more of an origin point or limit for translation of the automatic stage.

59. The system of any preceding embodiment, wherein the drive mechanism comprises a stepper motor coupled to a rack and pinion.

60. An apparatus for automatically scanning and imaging a slide containing a biological sample, comprising: (a) one or more optical elements having an optical path configured to be disposed within view of a camera of a portable device; (b) the one or more optical elements comprising an objective; (c) an automated stage disposed within the optical path, the automated stage comprising a platform configured for receiving a slide containing a biological sample and a drive mechanism for translating the stage in at least one direction with respect to said objective; (d) a communications interface coupled to the automated stage; (e) a computer processor; and (f)a non-transitory computer-readable memory storing instructions executable by the computer processor; (g) wherein said instructions, when executed by the computer processor, perform steps comprising: (i) for receiving a command from the portable device; (ii) sending the command via the communication interface to the automatic stage; and (iii) translating the mechanical stage in response to said command.

61. The system of any preceding embodiment: wherein the automated stage comprises an x-y stage comprising independent drive mechanisms for x-axis translation and y-axis translation of the slide with respect to the objective; and wherein said instructions when executed by the computer processor are further configured to control motion of the x-y stage via one or more commands initiated from the portable device.

62. The system of any preceding embodiment: wherein the automated stage comprises a z-axis stage comprising an independent drive mechanism for z-axis translation of the slide with respect to the objective; and wherein said instructions when executed by the computer processor are further configured to control motion of the stage via one or more commands initiated from the portable device to focus imaging of the sample on the slide.

63. The system of any preceding embodiment, further comprising: an illumination source coupled to the automated stage, the illumination source configured to direct light at the slide; and wherein said instructions when executed by the computer processor are further configured to control operation of the illumination source via one or more commands initiated at the portable device.

64. The system of any preceding embodiment, wherein the objective comprises an infinity objective, and the optical elements further comprise a plurality of mirrors folding the light path into a compact light path in line with an achromatic tube lens and the infinity objective.

65. The system of any preceding embodiment: wherein the portable device comprises a touch screen; and wherein said instructions when executed by the computer processor are further configured to control motion of the automated stage in response to one or more hand gestures applied to the touch screen.

66. The system of any preceding embodiment: wherein the communications interface comprises a wireless communication interface; and wherein motion of the automatic stage is controlled wirelessly from one or more hand gestures initiated at the touch screen.

67. The system of any preceding embodiment, wherein translation of the automatic stage is in proportion to the one or more gestures.

68. The system of any preceding embodiment, wherein translation of the automatic stage is affected as an automated sequence of motions in response to the one or more gestures.

69. The system of any preceding embodiment, wherein said instructions when executed by the computer processor are further configured to control one or more of bright field, dark field, phase, or intensity of the light directed by the illumination source.

70. The system of any preceding embodiment: wherein the illumination source comprises an LED array; and wherein said instructions when executed by the computer processor are further configured to vary the orientation and numerical aperture of the illumination light directed by the illumination source or initiate the acquisition of a series of illumination states with respect to the light directed by the illumination source.

71. The system of any preceding embodiment, wherein said instructions when executed by the computer processor are further configured to vary one or more of the numerical aperture, resolution, and field of view of the objective.

72. The system of any preceding embodiment, wherein said instructions when executed by the computer processor are further configured to vary a digital magnification of a region of interest of the sample and display a corresponding size calibration corresponding to the magnification.

73. The system of any preceding embodiment, wherein where illumination source is configured for fluorescence imaging of the sample.

74. The system of any preceding embodiment, further comprising: a calibration sample positioned within the optical path; wherein said instructions when executed by the computer processor are further configured to calibrate images of the sample of one or more of: focus, field flatness, illumination intensity, illumination uniformity, exposure, contrast, optical resolution, or stage translation/backlash.

75. The system of any preceding embodiment, wherein said instructions when executed by the computer processor are further configured to apply one or more shape metrics to classify features within an image of the sample.

76. The system of any preceding embodiment wherein said instructions when executed by the computer processor are further configured to process an image of the sample during motion of the automatic stage to determine a distance traveled and providing feedback for pixel-scale positioning of the automatic stage.

77. The system of any preceding embodiment, further comprising: one or more proximity sensors coupled to the automatic stage; wherein the one or more proximity sensors provide position data of the automatic stage for establishing one or more of an origin point or limit for translation of the automatic stage.

78. A method for automatically scanning and imaging a slide containing a biological sample, comprising: providing an automated stage having an optical path and an objective disposed within the optical path, the automated stage comprising a platform configured for receiving a slide containing a biological sample and a drive mechanism for translating the stage in at least one direction with respect to said objective; positioning a camera of a portable device in view of the optical path; sending a command from the portable device to the automatic stage; translating the mechanical stage in response to said command; and imaging the biological sample with the camera.

79. The method of any preceding embodiment, wherein the portable device comprises a touch screen, the method further comprising: controlling motion of the automated stage in response to one or more hand gestures applied to the touch screen.

80. The method of any preceding embodiment, the method further comprising: controlling motion of the stage via one or more commands initiated from the portable device to focus imaging of the sample on the slide.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
wherein the objective comprises an infinity objective, and the optical elements further comprise a plurality of mirrors folding the light path into a compact light path in line with an achromatic tube lens and the infinity objective.

2. A system as recited in claim 1, the portable device comprising a cellular device having a processor and memory, the system further comprising:
application programming configured to be stored as instructions in non-transitory computer-readable memory on the portable device; and
wherein the application programming is executable on the processor for executing the command.

3. A system as recited in claim 2:
wherein the automated stage comprises an x-y stage comprising independent drive mechanisms for x-axis translation and y-axis translation of the slide with respect to the objective; and
wherein the application programming is configured for controlling motion of the x-y stage via one or more commands initiated from the portable device.

4. A system as recited in claim 3:
wherein the automated stage comprises a z-axis stage comprising an independent drive mechanism for z-axis translation of the slide with respect to the objective; and
wherein the application programming is configured for controlling motion of the stage via one or more commands initiated from the portable device to focus imaging of the sample on the slide.

5. A system as recited in claim 2, further comprising:
an illumination source coupled to the automated stage, the illumination source configured to direct light at the slide; and
wherein the programming is further configured to control operation of the illumination source via one or more commands initiated at the portable device.

6. A system as recited in claim 2:
wherein the portable device comprises a touch screen; and
wherein the application programming comprises a gesture recognition module configured to control motion of the automated stage in response to one or more hand gestures applied to the touch screen.

7. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
wherein the drive mechanism comprises a stepper motor coupled to a rack and pinion.

8. A system as recited in claim 7, the portable device comprising a cellular device having a processor and memory, the system further comprising:
application programming configured to be stored as instructions in non-transitory computer-readable memory on the portable device; and
wherein the application programming is executable on the processor for executing the command.

9. A system as recited in claim 8:
wherein the automated stage comprises an x-y stage comprising independent drive mechanisms for x-axis translation and y-axis translation of the slide with respect to the objective; and
wherein the application programming is configured for controlling motion of the x-y stage via one or more commands initiated from the portable device.

10. A system as recited in claim 9:
wherein the automated stage comprises a z-axis stage comprising an independent drive mechanism for z-axis translation of the slide with respect to the objective; and
wherein the application programming is configured for controlling motion of the stage via one or more commands initiated from the portable device to focus imaging of the sample on the slide.

11. A system as recited in claim 8, further comprising:
an illumination source coupled to the automated stage, the illumination source configured to direct light at the slide; and
wherein the programming is further configured to control operation of the illumination source via one or more commands initiated at the portable device.

12. A system as recited in claim 8, wherein the objective comprises an infinity objective, and the optical elements further comprise a plurality of mirrors folding the light path into a compact light path in line with an achromatic tube lens and the infinity objective.

13. A system as recited in claim 8:
wherein the portable device comprises a touch screen; and
wherein the application programming comprises a gesture recognition module configured to control motion of the automated stage in response to one or more hand gestures applied to the touch screen.

14. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
wherein the portable device comprises a touch screen;
wherein the application programming comprises a gesture recognition module configured to control motion of the automated stage in response to one or more hand gestures applied to the touch screen; and
wherein translation of the automatic stage is affected as an automated sequence of motions in response to the one or more gestures.

15. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
wherein the portable device comprises a touch screen;
wherein the application programming comprises a gesture recognition module configured to control motion of the automated stage in response to one or more hand gestures applied to the touch screen;
wherein the communications interface comprises a wireless communication interface, and
wherein motion of the automatic stage is controlled wirelessly from one or more hand gestures initiated at the touch screen.

16. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
wherein the portable device comprises a touch screen;
wherein the application programming comprises a gesture recognition module configured to control motion of the automated stage in response to one or more hand gestures applied to the touch screen; and
wherein translation of the automatic stage is in proportion to the one or more gestures.

17. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
an illumination source coupled to the automated stage, the illumination source configured to direct light at the slide;
wherein the programming is further configured to control operation of the illumination source via one or more commands initiated at the portable device;
wherein the programming is further configured to control one or more of bright field, dark field, phase, or intensity of the light directed by the illumination source.

18. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
an illumination source coupled to the automated stage, the illumination source configured to direct light at the slide;
wherein the programming is further configured to control operation of the illumination source via one or more commands initiated at the portable device;
wherein the illumination source comprises an LED array; and wherein the application programming is further configured to vary the orientation and numerical aperture of the illumination light directed by the illumination source or initiate the acquisition of a series of illumination states with respect to the light directed by the illumination source.

19. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command; and
wherein the application programming is configured to vary one or more of the numerical aperture, resolution, and field of view of the objective.

20. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command; and
wherein the application programming is configured to vary a digital magnification of a region of interest of the sample and display a corresponding size calibration corresponding to the magnification.

21. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective; and
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
an illumination source coupled to the automated stage, the illumination source configured to direct light at the slide;
wherein the programming is further configured to control operation of the illumination source via one or more commands initiated at the portable device; and
wherein where illumination source and application programming are configured for fluorescence imaging of the sample.

22. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;
the automated stage comprising a drive mechanism for translating the stage in at least one direction with respect to said objective;
a communications interface coupled to the automated stage;
wherein the communication interface is configured for receiving a command from the portable device to control operation of the mechanical stage;
the portable device comprising a cellular device having a processor and memory;
the system further comprising:
application programming configured to be stored as instructions in non-transitory computer-readable memory on the portable device;
wherein the application programming is executable on the processor for executing the command;
a calibration sample positioned within the optical path;
wherein the application programming is configured to perform a calibration routine to provide calibration images of the sample of one or more of: focus, field flatness, illumination intensity, illumination uniformity, exposure, contrast, optical resolution, or stage translation/backlash.

23. An automated slide scanning system, comprising:
one or more optical elements having an optical path configured to be disposed within view of a camera of a portable device;
the one or more optical elements comprising an objective;
an automated stage disposed within the optical path;
the automated stage comprising a platform configured for receiving a slide containing a biological sample;

the automated stage comprising a drive mechanism for translating the stage in at least one direction with respect to said objective; and a communications interface coupled to the automated stage;

wherein the communication interface is configured for receiving a command from the portable device to control operation of the mechanical stage;

the portable device comprising a cellular device having a processor and memory;

the system further comprising:

application programming configured to be stored as instructions in non-transitory computer-readable memory on the portable device;

wherein the application programming is executable on the processor for executing the command; and wherein the application programming is configured to apply one or more shape metrics to classify features within an image of the sample.

24. An automated slide scanning system, comprising:

one or more optical elements having an optical path configured to be disposed within view of a camera of a portable device;

the one or more optical elements comprising an objective;

an automated stage disposed within the optical path;

the automated stage comprising a platform configured for receiving a slide containing a biological sample;

the automated stage comprising a drive mechanism for translating the stage in at least one direction with respect to said objective; and a communications interface coupled to the automated stage;

wherein the communication interface is configured for receiving a command from the portable device to control operation of the mechanical stage;

the portable device comprising a cellular device having a processor and memory;

the system further comprising:

application programming configured to be stored as instructions in non-transitory computer-readable memory on the portable device;

wherein the application programming is executable on the processor for executing the command; and wherein the application programming is configured to process an image of the sample during motion of the automatic stage to determine a distance traveled and providing feedback for pixel-scale positioning of the automatic stage.

25. An automated slide scanning system, comprising:

one or more optical elements having an optical path configured to be disposed within view of a camera of a portable device;

the one or more optical elements comprising an objective;

an automated stage disposed within the optical path;

the automated stage comprising a platform configured for receiving a slide containing a biological sample;

the automated stage comprising a drive mechanism for translating the stage in at least one direction with respect to said objective; and a communications interface coupled to the automated stage;

wherein the communication interface is configured for receiving a command from the portable device to control operation of the mechanical stage;

the portable device comprising a cellular device having a processor and memory;

the system further comprising:

application programming configured to be stored as instructions in non-transitory computer-readable memory on the portable device;

wherein the application programming is executable on the processor for executing the command;

one or more proximity sensors coupled to the automatic stage; and wherein the one or more proximity sensors provide position data of the automatic stage for establishing one or more of an origin point or limit for translation of the automatic stage.

* * * * *